United States Patent
Wang et al.

(10) Patent No.: US 10,784,982 B2
(45) Date of Patent: Sep. 22, 2020

(54) METHOD AND SYSTEM FOR ALLOCATING WAVELENGTH CHANNELS IN PASSIVE OPTICAL NETWORK, AND OPTICAL LINE TERMINAL

(71) Applicant: ZTE Corporation, Shenzhen (CN)

(72) Inventors: Xiaohua Wang, Shenzhen (CN); Shuang Zhang, Shenzhen (CN); Yan Chen, Shenzhen (CN); Dandan Zhang, Shenzhen (CN); Haiming Ouyang, Shenzhen (CN); Xiangrong Chen, Shenzhen (CN); Xingang Huang, Shenzhen (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 0 days.

(21) Appl. No.: 15/736,913

(22) PCT Filed: May 16, 2016

(86) PCT No.: PCT/CN2016/082252
§ 371 (c)(1),
(2) Date: Dec. 15, 2017

(87) PCT Pub. No.: WO2016/202127
PCT Pub. Date: Dec. 22, 2016

(65) Prior Publication Data
US 2018/0367235 A1 Dec. 20, 2018

(30) Foreign Application Priority Data
Jun. 15, 2015 (CN) .......................... 2015 1 0331017

(51) Int. Cl.
*H04J 14/00* (2006.01)
*H04J 14/02* (2006.01)
(Continued)

(52) U.S. Cl.
CPC .......... *H04J 14/0245* (2013.01); *H04B 10/25* (2013.01); *H04B 10/27* (2013.01);
(Continued)

(58) Field of Classification Search
None
See application file for complete search history.

(56) References Cited

U.S. PATENT DOCUMENTS 7,945,816 B1 * 5/2011 Gardner .............. G06F 11/2074
370/498
9,755,746 B1 * 9/2017 Detwiler ............ H04B 10/2575
(Continued)

FOREIGN PATENT DOCUMENTS

| CN | 102388557 A | 3/2012 |
| CN | 107710362 A | 10/2012 |

(Continued)

OTHER PUBLICATIONS

European Search Report for corresponding application EP16810868; Report dated May 28, 2018.
(Continued)

*Primary Examiner* — David C Payne
*Assistant Examiner* — Pranesh K Barua
(74) *Attorney, Agent, or Firm* — Cantor Colburn LLP

(57) ABSTRACT

Provided are a method and system for allocating wavelength channels in a Passive Optical Network (PON), and an Optical Line Terminal (OLT). In the method, an OLT may acquire pre-set wavelength channel priority information and Optical Network Unit (ONU) priority information; and the wavelength channel priority information and the ONU priority information may be sent to each ONU to enable each ONU to selectively access a corresponding wavelength
(Continued)

channel according to the wavelength channel priority information and the ONU priority information based on a pre-set rule.

9 Claims, 2 Drawing Sheets

(51) Int. Cl.
  *H04B 10/25* (2013.01)
  *H04B 10/27* (2013.01)
  *H04Q 11/00* (2006.01)
(52) U.S. Cl.
  CPC ...... *H04J 14/0254* (2013.01); *H04Q 11/0067* (2013.01); *H04Q 2011/0064* (2013.01)

(56) References Cited

U.S. PATENT DOCUMENTS

| | | | | |
|---|---|---|---|---|
| 2007/0071031 A1* | 3/2007 | Shin | ...................... | H04L 47/788 370/468 |
| 2007/0077068 A1* | 4/2007 | Mazed | ................ | H04J 14/0265 398/71 |
| 2007/0127487 A1* | 6/2007 | Kim | .................... | H04L 41/0896 370/392 |
| 2007/0133988 A1* | 6/2007 | Kim | .................... | H04J 14/0282 398/69 |
| 2007/0189773 A1* | 8/2007 | Jung | .................. | H04J 14/0226 398/72 |
| 2008/0025724 A1* | 1/2008 | Ozaki | ................ | H04Q 11/0067 398/68 |
| 2011/0255866 A1* | 10/2011 | Van Veen | .............. | H04J 3/1694 398/35 |
| 2012/0155858 A1* | 6/2012 | Ozaka | ................ | H04L 12/2861 398/24 |
| 2012/0166819 A1* | 6/2012 | Skubic | .................. | G06F 1/3278 713/300 |
| 2012/0308231 A1* | 12/2012 | Martinelli | ........... | H04J 14/0268 398/45 |
| 2013/0243419 A1* | 9/2013 | Gardner | ............... | H04B 10/038 398/5 |
| 2014/0219661 A1* | 8/2014 | Doo | ..................... | H04J 14/0227 398/68 |
| 2014/0248053 A1* | 9/2014 | Tamai | ................. | H04Q 11/0067 398/66 |
| 2014/0301734 A1* | 10/2014 | Fang | ...................... | H04B 10/60 398/76 |
| 2015/0023664 A1* | 1/2015 | Mukai | .................. | H04B 10/272 398/58 |
| 2015/0125149 A1* | 5/2015 | Gao | .................... | H04J 14/0246 398/58 |
| 2015/0229431 A1* | 8/2015 | Sugawa | .............. | H04J 14/0257 398/72 |
| 2017/0117965 A1* | 4/2017 | Fujino | .................. | H04B 10/272 |

FOREIGN PATENT DOCUMENTS

| | | |
|---|---|---|
| CN | 103401632 A | 11/2013 |
| CN | 103475439 A | 12/2013 |
| CN | 103888382 A | 6/2014 |
| CN | 104137490 A | 11/2014 |
| CN | 104320726 A | 1/2015 |

OTHER PUBLICATIONS

Lei Shi, et al., "Study on Dynamic Wavelength Assignment in Condition of Finite ONU's Based on Priority Rotation in WDM-PON", Microwave Conference, Sep. 10, 2008, pp. 793-796, XP031417394.

Yuanqiu Luo, et al., :Wavelength management in time and wavelength division multiplexed passive optical networks (TWDM-PONS), Global Communications Conference, Dec. 3, 2012, pp. 2971-2976, XP032375126.

International Search Report for corresponding application PCT/CN2016/082252 filed May 16, 2016; dated Jul. 19, 2016.

* cited by examiner

METHOD AND SYSTEM FOR ALLOCATING WAVELENGTH CHANNELS IN PASSIVE OPTICAL NETWORK, AND OPTICAL LINE TERMINAL

TECHNICAL FIELD

The present application relates to, but is not limited to, the technical field of Passive Optical Networks (PON).

BACKGROUND

In the technical field of PONs, each PON port may aggregate multiple wavelength channels in a wavelength division multiplexing manner, and an Optical Network Unit (ONU) may select and register to use a wavelength channel, so that a larger bandwidth may be provided for a user such as NG-PON2 equipment. When the ONU is registered and gets online, the ONU may need to make a choice between multiple wavelength channels aggregated by the PON port.

Allocation of wavelength channels in a PON is random. That is, selection of a wavelength channel by an Optical Line Terminal (OLT) and selection of a wavelength channel by an ONU are not distinguished, and are random. Thus, if some users with special demands need an OLT to provide specific service configurations for an ONU on a special wavelength channel, since the wavelength channel selected by the ONU cannot be distinguished, the ONU cannot select a wavelength channel configured with the specific service, so that the corresponding service has to be configured on all the wavelength channels, thereby causing resource waste. A problem that an ONU cannot selectively access a corresponding wavelength channel remains to be solved.

SUMMARY

The following is a brief introduction for a subject matter described herein in detail. The brief introduction is not intended to restrict the scope of protection of claims.

The present disclosure provides a method and system for allocating wavelength channels in a PON, and an OLT, which may enable an ONU to selectively access a corresponding wavelength channel.

A method for allocating wavelength channels in a PON is provided. The method may include the acts as follows.

An OLT may acquire pre-set wavelength channel priority information and ONU priority information.

The wavelength channel priority information and the ONU priority information may be sent to each ONU to enable each ONU to selectively access a corresponding wavelength channel according to the wavelength channel priority information and the ONU priority information based on a pre-set rule.

In an exemplary embodiment, after the wavelength channel priority information and the ONU priority information are sent to each ONU to enable each ONU to selectively access the corresponding wavelength channel according to the wavelength channel priority information and the ONU priority information based on the pre-set rule, the method may further include the act as follows.

When the OLT detects that a current wavelength channel and an ONU currently accessing the wavelength channel satisfy a pre-set switching condition, the wavelength channel currently accessed by the ONU may be switched into a wavelength channel satisfying a pre-set priority condition.

In an exemplary embodiment, the act that the wavelength channel currently accessed by the ONU is switched into the wavelength channel satisfying the pre-set priority condition when the OLT detects that the current wavelength channel and the ONU currently accessing the wavelength channel satisfy the pre-set switching condition may be implemented as follows.

When the OLT detects that a priority of the current wavelength channel is greater than a priority of the ONU currently accessing the wavelength channel or the current wavelength channel has a failure, first alternative wavelength channels, of which priorities are smaller than or equal to the priority of the ONU, in current available wavelength channels may be acquired, and the wavelength channel currently accessed by the ONU may be switched into a wavelength channel with highest priority in the first alternative wavelength channels.

In an exemplary embodiment, the wavelength channel priority information and the ONU priority information may be sent to each ONU in a following manner.

The OLT may send the wavelength channel priority information and the ONU priority information to each ONU via a Physical Layer Operation Administration and Maintenance (PLOAM) message.

An OLT is provided. The OLT may include an acquisition module and a sending module.

The acquisition module may be configured to acquire pre-set wavelength channel priority information and ONU priority information.

The sending module may be configured to send the wavelength channel priority information and the ONU priority information to each ONU to enable each ONU to selectively access a corresponding wavelength channel according to the wavelength channel priority information and the ONU priority information based on a pre-set rule.

In an exemplary embodiment, the OLT may further include a switching module.

The switching module may be configured to switch, when the OLT detects that a current wavelength channel and an ONU currently accessing the wavelength channel satisfy a pre-set switching condition, the wavelength channel currently accessed by the ONU into a wavelength channel satisfying a pre-set priority condition.

In an exemplary embodiment, the switching module may be configured to:

acquire, when the OLT detects that a priority of the current wavelength channel is greater than a priority of the ONU currently accessing the wavelength channel or the current wavelength channel has a failure, first alternative wavelength channels, of which priorities are smaller than or equal to the priority of the ONU, in current available wavelength channels, and switch the wavelength channel currently accessed by the ONU into a wavelength channel with highest priority in the first alternative wavelength channels.

In an exemplary embodiment, the sending module may be configured to:

send the wavelength channel priority information and the ONU priority information to each ONU via a PLOAM message.

A system for allocating wavelength channels in a PON is provided. The system may include an OLT and ONUs.

The OLT may be configured to acquire pre-set wavelength channel priority information and ONU priority information, and send the wavelength channel priority information and the ONU priority information to each ONU.

Each ONU may be configured to selectively access a corresponding wavelength channel according to the wavelength channel priority information and the ONU priority information based on a pre-set rule.

In an exemplary embodiment, each ONU may be configured to:

acquire, when registering to a wavelength channel, second alternative wavelength channels, of which priorities are smaller than or equal to a priority of the ONU, in current available wavelength channels, and select to register to and access a wavelength channel with highest priority in the second alternative wavelength channels.

A computer-readable storage medium may store a computer-executable instruction, and the computer-executable instruction may be used to execute the method as mentioned above in any one item.

The exemplary embodiments of the present disclosure provide a method and system for allocating wavelength channels in a PON, and an OLT. An OLT may send pre-set wavelength channel priority information and ONU priority information of a PON port to each ONU, and the ONUs may selectively access corresponding wavelength channels according to the wavelength channel priority information and the ONU priority information based on a pre-set rule. Since an ONU can selectively access a corresponding wavelength channel according to priority information of the ONU and the wavelength channel priority information, an OLT may configure a specific service on the corresponding wavelength channel. As such, the corresponding ONU may use the specific service, and different services may be provided for different ONUs, thereby being more flexible.

After the drawings and the detailed descriptions are read and understood, other aspects may be understood.

DETAILED DESCRIPTION OF THE EMBODIMENTS

It will be appreciated that the exemplary embodiments described here are only used to explain the present application and not to limit the present application.

An exemplary embodiment of the present disclosure provides a method for allocating wavelength channels in a PON.

Figure 1:
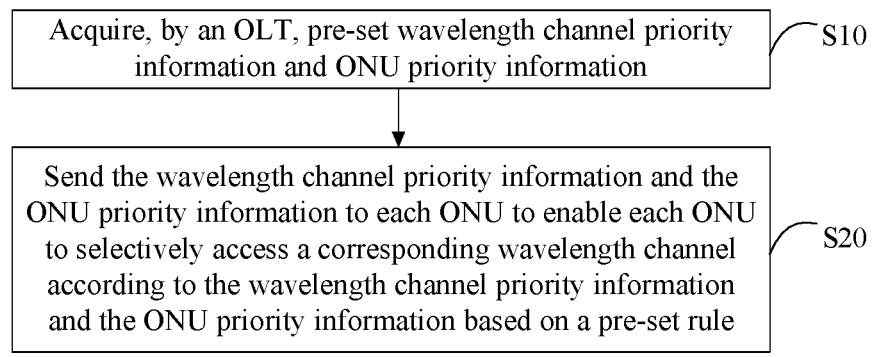
FIG. 1 is a flowchart of a method for allocating wavelength channels in a PON according to a first exemplary embodiment of the present disclosure.

Referring to FIG. 1, FIG. 1 is a flowchart of a method for allocating wavelength channels in a PON according to a first exemplary embodiment of the present disclosure.

In the first exemplary embodiment, the method for allocating wavelength channels in a PON may include the acts as follows.

At act S10, an OLT may acquire pre-set wavelength channel priority information and ONU priority information.

In the present exemplary embodiment, a user may pre-set different priorities of multiple wavelength channels in a PON port of an OLT and priorities of different ONUs of a corresponding client according to requirements of service configuration. For example, the user may set the priority of a wavelength channel configured with a specific service to be higher and also set the priority of a client ONU needing to use the specific service to be higher. Besides, the OLT may automatically configure the priority of a wavelength channel and the priority of a corresponding ONU in accordance with a pre-set strategy. For example, the priority of the wavelength channel configured with the specific service may be automatically set to be higher according to recorded user configuration habits, and meanwhile, the priority of an idiomatic client ONU may also be set to be higher.

The OLT may acquire pre-set wavelength channel priority information and ONU priority information. The wavelength channel priority information may include a priority of each wavelength channel, and the ONU priority information may include a priority of each ONU.

At act S20, the wavelength channel priority information and the ONU priority information may be sent to each ONU to enable each ONU to selectively access a corresponding wavelength channel according to the wavelength channel priority information and the ONU priority information based on a pre-set rule.

The pre-set wavelength channel priority information and ONU priority information may be sent to each ONU. Thus, each ONU may selectively access a corresponding wavelength channel according to the priority of the ONU and the priority of currently alternative wavelength channels based on a pre-set rule to enable each ONU to selectively access a corresponding wavelength channel.

By means of the present exemplary embodiment, an OLT may send pre-set wavelength channel priority information and ONU priority information of a PON port to each ONU, and the ONUs may selectively access corresponding wavelength channels according to the wavelength channel priority information and the ONU priority information based on a pre-set rule. Since an ONU may selectively access a corresponding wavelength channel according to the priority information of the ONU and the wavelength channel priority information, an OLT may configure a specific service on the corresponding wavelength channel. As such, the corresponding ONU may use the specific service, and different services may be provided for different ONUs, thereby being more flexible.

Figure 2:
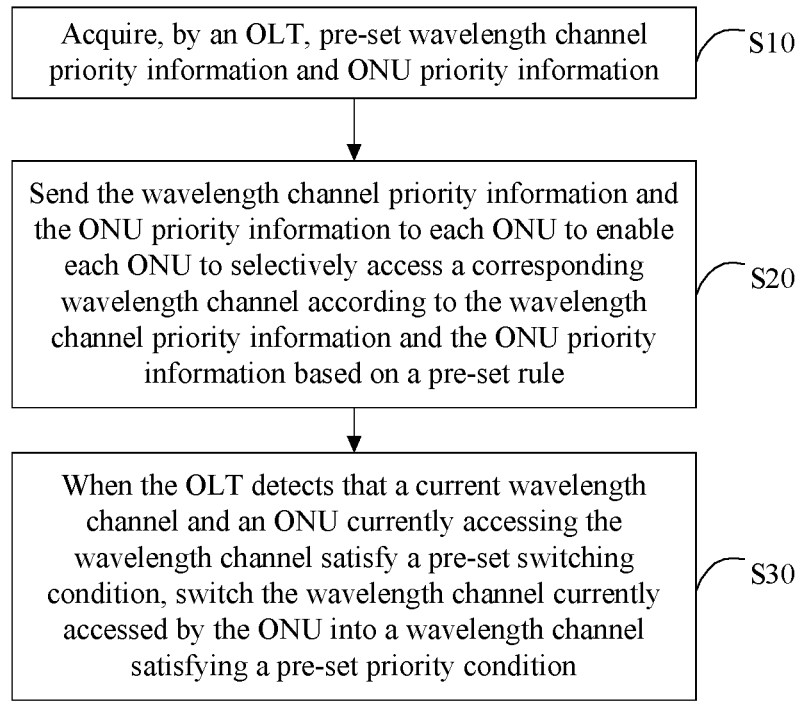
FIG. 2 is a flowchart of a method for allocating wavelength channels in a PON according to a second exemplary embodiment of the present disclosure.

As shown in FIG. 2, a second exemplary embodiment of the present disclosure provides a method for allocating wavelength channels in a PON. On the basis of the first exemplary embodiment, after act S20, the method may further include the act S30 as follows.

At act S30, when the OLT detects that a current wavelength channel and an ONU currently accessing the wavelength channel satisfy a pre-set switching condition, the wavelength channel currently accessed by the ONU may be switched into a wavelength channel satisfying a pre-set priority condition.

In the present exemplary embodiment, when the OLT detects that a current wavelength channel and an ONU currently accessing the wavelength channel satisfy a pre-set switching condition, if it is detected that a priority of the current wavelength channel is greater than a priority of the ONU currently accessing the wavelength channel or the current wavelength channel has a failure, it means that the current wavelength channel and the ONU currently accessing the wavelength channel do not match with each other, and it may be needed to switch the wavelength channel currently accessed by the ONU. First alternative wavelength channels, of which priorities are smaller than or equal to the priority of the ONU, in current available wavelength channels may be acquired. The first alternative wavelength channels may include multiple wavelength channels. A wavelength channel with highest priority may be selected from the first alternative wavelength channels, and the wavelength channel currently accessed by the ONU may be switched into the wavelength channel with the highest priority selected from the first alternative wavelength channels. Thus, it may be ensured that the priority of a current wavelength channel is greater than the priority of an ONU currently accessing the wavelength channel. To be more specific, a specific service configured on a wavelength channel with a higher priority may be currently and falsely occupied by a common client ONU with a low priority, and is not used by a pre-set high-priority client ONU corresponding to the specific service configured on the wavelength channel with the higher priority. Under such a condition, the common client ONU with the low priority may be switched to a wavelength channel of which the priority is not higher than and is proximal to the priority of the common client ONU, so that the common client ONU with the low priority may select to work on a wavelength channel suitable for its resource occupation. By virtue of the solution, it may be ensured that the high-priority wavelength channel configured with the specific service may be emptied so as to be occupied by the corresponding high-priority client ONU, and demands for using a specific service by a high-priority client ONU can be met.

In other exemplary embodiments, the act S20 may be implemented as follows.

The OLT may send the wavelength channel priority information and the ONU priority information to each ONU via a PLOAM message.

In the present exemplary embodiment, the OLT may send the pre-set wavelength channel priority information and ONU priority information to each ONU via a PLOAM message. It may be more flexible and rapider to use the PLOAM message to transmit the pre-set wavelength channel priority information and ONU priority information. In the present exemplary embodiment, an NG-PON2 standard PLOAM message, a custom PLOAM message or other custom messages in a random form may be used, which will not be limited herein.

Another exemplary embodiment of the present disclosure provides a computer-readable storage medium, which may store a computer-executable instruction, and the computer-executable instruction may be used to execute the above-mentioned method for allocating wavelength channels in a PON.

Another exemplary embodiment of the present disclosure provides an OLT.

Figure 3:
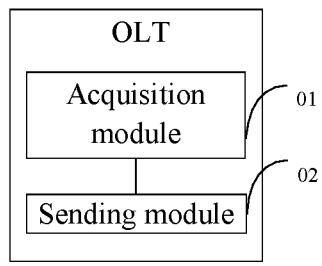
FIG. 3 is a function module diagram of an OLT according to a first exemplary embodiment of the present disclosure.

Referring to FIG. 3, FIG. 3 is a function module diagram of an OLT according to a first exemplary embodiment of the present disclosure.

In the first exemplary embodiment, the OLT may include: an acquisition module 01 and a sending module 02.

The acquisition module 01 may be configured to acquire pre-set wavelength channel priority information and ONU priority information.

In the present exemplary embodiment, a user may pre-set different priorities of multiple wavelength channels in a PON port of an OLT and priorities of different ONUs of a corresponding client according to requirements of service configuration. For example, the user may set the priority of a wavelength channel configured with a specific service to be higher and also set the priority of a client ONU needing to use the specific service to be higher. Besides, the OLT may automatically configure the priority of a wavelength channel and the priority of a corresponding ONU in accordance with a pre-set strategy. For example, the priority of the wavelength channel configured with the specific service may be automatically set to be higher according to recorded user configuration habits, and the priority of an idiomatic client ONU may also be set to be higher.

The OLT may acquire pre-set wavelength channel priority information and ONU priority information. The wavelength channel priority information may include a priority of each wavelength channel, and the ONU priority information may include a priority of each ONU.

The sending module 02 may be configured to send the wavelength channel priority information and the ONU priority information to each ONU to enable each ONU to selectively access a corresponding wavelength channel according to the wavelength channel priority information and the ONU priority information based on a pre-set rule.

The pre-set wavelength channel priority information and ONU priority information may be sent to each ONU. Thus, each ONU may selectively access a corresponding wavelength channel according to the priority of the ONU and the priority of currently alternative wavelength channels based on a pre-set rule to enable each ONU to selectively access a corresponding wavelength channel.

By means of the present exemplary embodiment, an OLT may send pre-set wavelength channel priority information and ONU priority information of a PON port to each ONU, and the ONUs may selectively access corresponding wavelength channels according to the wavelength channel priority information and the ONU priority information based on a pre-set rule. Since an ONU may selectively access a corresponding wavelength channel according to the priority information of the ONU and the wavelength channel priority information, an OLT may configure a specific service on the corresponding wavelength channel. As such, the corresponding ONU may use the specific service, and different services may be provided for different ONUs, thereby being more flexible.

Figure 4:
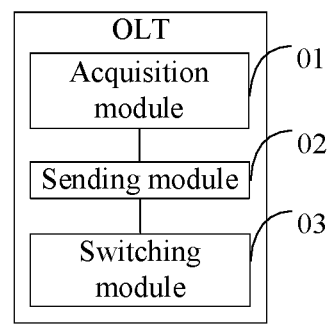
FIG. 4 is a function module diagram of an OLT according to a second exemplary embodiment of the present disclosure.

As shown in FIG. 4, the second exemplary embodiment of the present disclosure provides an OLT. On the basis of the first exemplary embodiment, the OLT may further include a switching module 03.

The switching module 03 may be configured to switch, when the OLT detects that a current wavelength channel and an ONU currently accessing the wavelength channel satisfy a pre-set switching condition, the wavelength channel currently accessed by the ONU into a wavelength channel satisfying a pre-set priority condition.

In the present exemplary embodiment, when the OLT detects that a current wavelength channel and an ONU currently accessing the wavelength channel satisfy a pre-set switching condition, if it is detected that a priority of the current wavelength channel is greater than a priority of the ONU currently accessing the wavelength channel or the current wavelength channel has a failure, it may represent that the current wavelength channel and the ONU currently accessing the wavelength channel do not match, and it may be needed to switch the wavelength channel currently accessed by the ONU. First alternative wavelength channels, of which priorities are smaller than or equal to the priority of the ONU, in current available wavelength channels may be acquired. The first alternative wavelength channels may include multiple wavelength channels. A wavelength channel with highest priority may be selected from the first alternative wavelength channels, and the wavelength channel currently accessed by the ONU may be switched into the wavelength channel with the highest priority selected from the first alternative wavelength channels. Thus, it may be ensured that the priority of a current wavelength channel is greater than the priority of an ONU currently accessing the wavelength channel. To be more specific, a specific service configured on a wavelength channel with a higher priority may be currently and falsely occupied by a common client ONU with a low priority, and is not used by a pre-set high-priority client ONU corresponding to the specific service configured on the wavelength channel with the higher priority. Under such a condition, the common client ONU with the low priority may be switched to a wavelength channel of which the priority is not higher than and is proximal to the priority of the common client ONU, so that the common client ONU with the low priority may select to work on a wavelength channel suitable for its resource occupation. By virtue of the solution, it may also be ensured that the high-priority wavelength channel configured with the specific service may be emptied so as to be occupied by the corresponding high-priority client ONU, and demands for using a specific service by a high-priority client ONU can be met.

In other exemplary embodiments, the sending module 02 may be configured to:

send the wavelength channel priority information and the ONU priority information to each ONU via a PLOAM message.

In the present exemplary embodiment, the OLT may send the pre-set wavelength channel priority information and ONU priority information to each ONU via a PLOAM message. It may be more flexible and rapider to use the PLOAM message to transmit the pre-set wavelength channel priority information and ONU priority information. In the present exemplary embodiment, an NG-PON2 standard PLOAM message, a custom PLOAM message or other custom messages in a random form may be used, which will not be limited herein.

Still another exemplary embodiment of the present disclosure provides a system for allocating wavelength channels in a PON.

Figure 5:
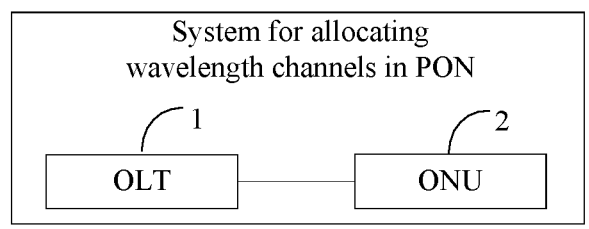
FIG. 5 is a structure diagram of a system for allocating wavelength channels in a PON according to an exemplary embodiment of the present disclosure.

Referring to FIG. 5, FIG. 5 is a structure diagram of a system for allocating wavelength channels in a PON according to an exemplary embodiment of the present disclosure.

In an exemplary embodiment, the system for allocating wavelength channels in a PON may include an OLT 1 and ONUs 2.

The OLT 1 may be configured to acquire pre-set wavelength channel priority information and ONU priority information, and send the wavelength channel priority information and the ONU priority information to each ONU 2.

Each ONU 2 may be configured to selectively access a corresponding wavelength channel according to the wavelength channel priority information and the ONU priority information based on a pre-set rule.

In the present exemplary embodiment, the OLT 1 may acquire pre-set wavelength channel priority information and ONU priority information, and may send the pre-set wavelength channel priority information and ONU priority information to each ONU 2. Thus, each ONU 2 may selectively access a corresponding wavelength channel according to the priority of the ONU 2 and the priority of a currently alternative wavelength channel, so that the ONUs 2 may selectively access corresponding wavelength channels.

After each ONU 2 receives the wavelength channel priority information and the ONU priority information sent by the OLT 1, the priority of the ONU 2 and the priority of a currently alternative wavelength channel may be acquired. When needing to register to a wavelength channel, the ONU 2 may acquire second alternative wavelength channels, of which priorities are smaller than or equal to the priority of the ONU 2, in current available wavelength channels. The second alternative wavelength channels may include multiple wavelength channels. A wavelength channel with highest priority may be selected from the second alternative wavelength channels, and the ONU 2 may select to register to and access the wavelength channel with the highest priority in the second alternative wavelength channels. Thus, when the priority of a wavelength channel configured with a specific service is pre-set to be higher and the priority of a client ONU 2 needing to use the specific service is also set to be higher, the ONU 2 may selectively use a high-priority wavelength channel of which the priority is proximal to the priority of the ONU 2 in the current available wavelength channels for registration and access. In this way, the ONU 2 may normally use the wavelength channel configured with the specific service, and the ONU 2 may selectively access the corresponding wavelength channel.

When the OLT 1 detects that a current wavelength channel and an ONU currently accessing the wavelength channel 2 satisfy a pre-set switching condition, the OLT 1 may switch the wavelength channel currently accessed by the ONU 2 into a wavelength channel satisfying a pre-set priority condition. The process of controlling, by the OLT 1, the ONU 2 to automatically switch the wavelength channel is as mentioned above, and will not be elaborated herein.

By means of the present exemplary embodiment, the OLT 1 may send pre-set wavelength channel priority information and ONU priority information of a PON port to each ONU 2. The ONUs 2 may selectively access corresponding wavelength channels according to the wavelength channel priority information and the ONU priority information based on a pre-set rule. Since the ONUs 2 may selectively access corresponding wavelength channels according to the priority information of the ONUs 2 and the wavelength channel priority information, the OLT 1 may configure a specific service on the corresponding wavelength channel, so that the corresponding ONU 2 may use the specific service, and different services may be provided for different ONUs 2, thereby being more flexible.

The serial numbers of the exemplary embodiments of the present disclosure are only used for descriptions, and do not represent the preference of the exemplary embodiments. By means of the description of the above-mentioned implementation mode, a person skilled in the art may clearly know that the method according to the above-mentioned exemplary embodiment may be implemented by means of software and a necessary general hardware platform, or may, certainly, be implemented by hardware. However, under many circumstances, the former may serve as a preferred implementation mode. Based on such understanding, the solutions of the exemplary embodiments of the present disclosure may be substantially embodied in a form of software product or parts contributing to a related technology may be embodied in a form of software product. The computer software product may be stored in a storage medium (such as a Read-Only Memory/Random Access Memory (ROM/RAM), a magnetic disk or an optical disk), which may include a plurality of instructions enabling terminal equipment (which may be a mobile phone, a computer, a server or network equipment) to execute the method according to each exemplary embodiment of the present disclosure.

The above is only the exemplary embodiments of the present disclosure and is not used to limit the patent scope of the present disclosure. Equivalent structure or equivalent flow transformations made by utilizing the description and drawings of the present disclosure or direct or indirect applications to other relevant fields may fall within the scope of patent protection defined by the appended claims of the present disclosure.

INDUSTRIAL APPLICABILITY

By means of some exemplary embodiments of the present disclosure, since an ONU may selectively access a corresponding wavelength channel according to the priority information of the ONU and the wavelength channel priority information, an OLT may configure a specific service on the corresponding wavelength channel. As such, the corresponding ONU may use the specific service, and different services may be provided for different ONUs, thereby being more flexible.

What is claimed is:

1. A method for allocating wavelength channels in a Passive Optical Network (PON), comprising:
    acquiring, by an Optical Line Terminal (OLT), information of preset priorities of wavelength channels and information of preset priorities of Optical Network Unit (ONUs), and the priorities of wavelength channels and the priorities of ONUs are set according to requirements of service configuration; and
    sending the information of priorities of wavelength channels and the information of priorities of ONUs to each ONU to enable each ONU to selectively access a corresponding wavelength channel according to the information of priorities of wavelength channels and the information of priorities of ONUs based on a pre-set rule;
    when the OLT detects that a current wavelength channel and an ONU currently accessing the wavelength channel satisfy a pre-set switching condition, switching the wavelength channel currently accessed by the ONU into a wavelength channel satisfying a pre-set priority condition;
    wherein switching the wavelength channel currently accessed by the ONU into the wavelength channel satisfying the pre-set priority condition when the OLT detects that the current wavelength channel and the ONU currently accessing the wavelength channel satisfy the pre-set switching condition comprises:
    when the OLT detects that a priority of the current wavelength channel is greater than a priority of the ONU currently accessing the wavelength channel or the current wavelength channel has a failure, acquiring first alternative wavelength channels, of which priorities are smaller than or equal to the priority of the ONU, in current available wavelength channels, and switching the wavelength channel currently accessed by the ONU into a wavelength channel with highest priority in the first alternative wavelength channels.

2. The method for allocating wavelength channels in a PON as claimed in claim 1, wherein sending the information of priorities of wavelength channels and the information of priorities of ONUs to each ONU comprises:
    sending, by the OLT, the information of priorities of wavelength channels and the information of priorities of ONUs to each ONU via a Physical Layer Operation Administration and Maintenance (PLOAM) message.

3. The method for allocating wavelength channels in a PON as claimed in claim 1, wherein the pre-set rule comprises: the ONU accesses a wavelength channel with priority smaller than or equal to a priority of the ONU.

4. The method for allocating wavelength channels in a PON as claimed in claim 1, wherein the information of priorities of wavelength channels comprises a priority of each wavelength channel, and the information of priorities of ONUs comprises a priority of each ONU.

5. An Optical Line Terminal (OLT), which comprises a hardware processor and a memory, the hardware processor is configured to execute software modules stored in the memory, and the software modules comprising:
    an acquisition software module, which is executed by the hardware processor to acquire information of preset priorities of wavelength channels and information of preset priorities of Optical Network Unit (ONUs), and the priorities of wavelength channels and the priorities of ONUs are set according to requirements of service configuration; and
    a sending software module, which is executed by the hardware processor to send the information of priorities of wavelength channels and the information of priorities of ONUs to each ONU to enable each ONU to selectively access the corresponding wavelength channel according to the information of priorities of wavelength channels and the information of priorities of ONUs based on a pre-set rule;
    a switching software module, which is executed by the hardware processor to switch, when the OLT detects that a current wavelength channel and an ONU currently accessing the wavelength channel satisfy a pre-set switching condition, the wavelength channel currently accessed by the ONU into a wavelength channel satisfying a pre-set priority condition;
    wherein the switching software module is executed by the hardware processor to:
    acquire, when the OLT detects that a priority of the current wavelength channel is greater than a priority of the ONU currently accessing the wavelength channel or the current wavelength channel has a failure, first alternative wavelength channels, of which priorities are smaller than or equal to the priority of the ONU, in current available wavelength channels, and switch the wavelength channel currently accessed by the ONU into a wavelength channel with highest priority in the first alternative wavelength channels.

6. The OLT as claimed in claim 5, wherein the sending module is configured to:
    send the information of priorities of wavelength channels and the information of priorities of ONUs to each ONU via a Physical Layer Operation Administration and Maintenance (PLOAM) message.

7. A system for allocating wavelength channels in a Passive Optical Network (PON), comprising the Optical Line Terminal (OLT) as claimed in claim and Optical Network Units (ONU), wherein
    each ONU is configured to selectively access a corresponding wavelength channel according to the information of priorities of wavelength channels and the information of priorities of ONUs based on a pre-set rule.

8. The system for allocating wavelength channels in a PON as claimed in claim 7, wherein each ONU is configured to:

acquire, when registering to a wavelength channel, second alternative wavelength channels, of which priorities are smaller than or equal to a priority of the ONU, in current available wavelength channels, and select to register to and access a wavelength channel with highest priority in the second alternative wavelength channels.

9. The OLT as claimed in claim 5, wherein the pre-set rule comprises: the ONU accesses a wavelength channel with priority smaller than or equal to a priority of the ONU.

* * * * *